Figures 1, 2:
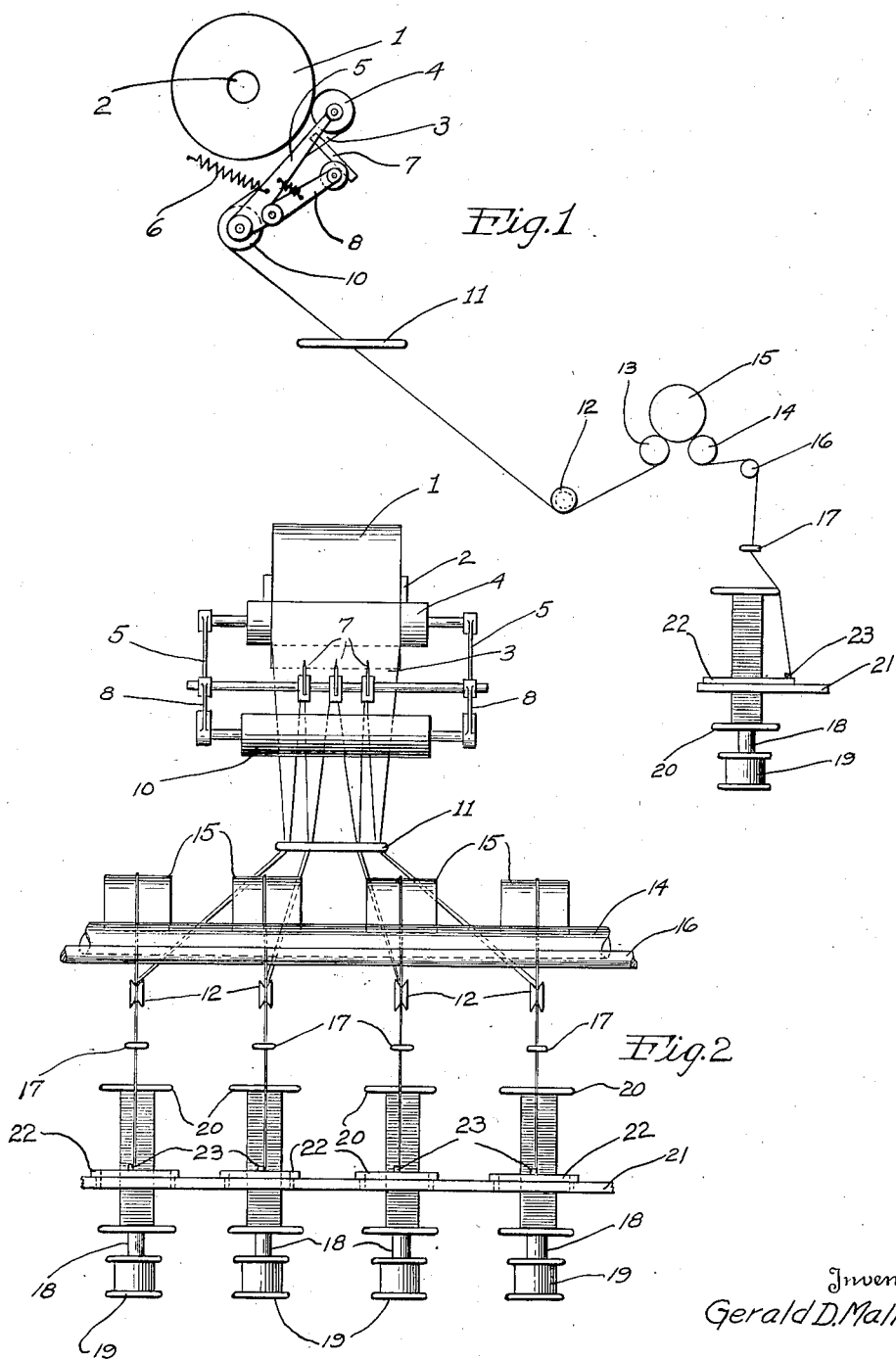

Sept. 16, 1941.   G. D. MALLORY   2,256,150
APPARATUS AND METHOD FOR PRODUCING ELASTIC YARN
Filed Aug. 2, 1940

Inventor
Gerald D. Mallory
By R H Waters
Attorney

Patented Sept. 16, 1941

2,256,150

UNITED STATES PATENT OFFICE 2,256,150

APPARATUS AND METHOD FOR PRODUCING ELASTIC YARN

Gerald D. Mallory, Akron, Ohio, assignor to Wingfoot Corporation, Wilmington, Del., a corporation of Delaware Application August 2, 1940, Serial No. 349,644

5 Claims. (Cl. 57—34)

This invention relates to the manufacture of yarn-like or thread-like structures of rubber hydrochloride.

According to this invention, a ribbon or film of rubber hydrochloride is slit into a plurality of narrow strips. These strips are then twisted. According to a preferred method, a cast ribbon or film is slit into narrow strips, and these strips are stretched to increase their tensile strength prior to, during, or after the twisting. By applying an adhesive to the strips, or by use of a solvent, or by heating to a temperature at which the strips become tacky, the overlapping portions of the twisted strips may be united so that they cannot thereafter be untwisted. This is an optional procedure, as for certain purposes it is desirable to have a strip which can be untwisted. For instance, for weaving mats, tapestries, upholstery, etc., a yarn-like strand is preferred which has more bulk and is not as tightly compacted as those where adhesive has been employed. On the other hand, for the manufacture of cloth, or the manufacture of a cord fabric for use in tires or belts, or the like, a more tightly compacted thread-like structure will generally be preferred and preferably one that cannot become untwisted. Also for the many other uses where the structures of the present invention are to replace thread and strings, the use of an adhesive may be preferred.

According to this invention these various products and the like are to be made on machines which are modifications of the usual cotton twisting machines. These twisters comprise driven rolls for feeding untwisted stock to the rotating spindle for twist, a thread guide over the spindle, a ring, a traveller, and traversing mechanism for guiding the thread while being twisted, to a spool on the rotating spindle.

The usual cotton twister comprises a plurality of spools each of which has a separate source of supply. According to the present invention, a single sheet of film is slit into a plurality, e. g. three or four or up to eight or ten or more, strips each of which is twisted onto a separate spool. Apparatus for carrying out such a process is described in detail and claimed in the application of R. C. Martin, Serial No. 349,881, filed August 2, 1940. Two or more films of rubber hydrochloride may be slit into narrow strips, and one narrow strip from each of these films may be twisted onto each of the spools. Or as a still further alternative, several narrow strips formed from one film may be twisted together and wound onto a single spool. The processes of this invention preferably include heating and stretching the film.

If the overlapping portions of the twisted product are to be united the twister must be equipped with means for supplying adhesive or a solvent, or it must be provided with heating means, all of which must be adapted to act on the rubber hydrochloride in an appropriate way. A preferred arrangement is to apply the adhesive or solvent to the narrow strip cut from the film after it passes through the delivery rolls over the spool, and before it enters the guide on the way to the spool. If heat is to be used to cause the overlapping portions of the strip to coalesce together, this heat is advantageously applied to the rubber hydrochloride by heating one of the rolls over which the narrow strips pass, or a hot sleeve might be provided for this purpose. This sleeve may be movable, partly driven, or driven. After heating to the temperature at which the film becomes adherent when pressure is applied, the strip is twisted and passed through the eyelet or other guide to the traveller and onto the spool of the twister.

If the film is to be stretched between the delivery roll and the spool, it will be heated either in passing over one or more of the rolls, or separate heating means may be provided. For stretching it is not necessary or desirable to heat the film to the same temperature to which it is heated in order to cause overlapping portions to coalesce. However, if the film is to be stretched and overlapping portions are to be coalesced, a single heating step is all that is required, and the film may be stretched before or after coalescing. Ordinarily where the film is to be stretched, it will be passed over a heating roll and will be stretched by being drawn away from the heating roll at a greater speed than it is fed to the roll. The usual purpose for stretching the film will be to increase the tensile strength of the product. This may be done by heating the film to a temperature of, for example, 80 to 110° C., and stretching it to at least two, three or four times its original length. For example, the film may be stretched up to four times its original length, or five or six or seven to ten times its original length or more. In order to stretch the film it is only necessary to provide equipment to feed the stretched film to the spool at a higher rate than the film is fed to the stretching equipment.

The film ordinarily used on the machine of this invention will be cast rubber hydrochloride film varying from about .0008 inch to .002 inch although a film somewhat thinner or thicker may be employed. This film may be stretched as above described. Instead of using such film, the film delivered to the machine may be previously stretched, for example, it may be film produced by stretching a cast sheet .0008 to .002 inch thick to a film only one-fourth this thick or even somewhat thinner. A roll of such film may be slit and twisted as herein described, with or without the use of adhesive, etc.

It is possible to combine strips of film slit from different rolls. For example, for some purposes it may be desirable to combine stretched and unstretched film and twist them together. For this purpose a part of the film may be stretched on the machine, or film which has been previously stretched may be fed to the machine together with film that has not been stretched. In a similar way other different types of film may be fed simultaneously to a single spool. For example, part of the film fed to the spool may be plasticized and the other part unplasticized. Part of the film may be dyed or pigmented whereas other film is uncolored, or films which have been differently colored may be fed to the same spool.

The invention will be further described in connection with the accompanying drawing in which Fig. 1 is a view in perspective and Fig. 2 is a front view.

The roll of cast rubber hydrochloride film 1 from which the twisted strips are to be formed is supported on any suitable bar 2. The film 3 is brought from this roll 1 over the roll 4 which is mounted on the arms 5 which are held by the spring 6 so that the roll 4 is continuously held against the roll of film 1, regardless of whether the roll 1 is large as at the first of a run, or small as near the end of a run when the film on the roll 1 has been almost entirely used up. As the film leaves the roll 4, it is split by the knife blades 7 which are supported by the bars 8 which are supported from the bar 5 by hinges and held in position by a spring. The purpose in mounting the knives and the roll 4 on movable bars is to give flexibility to the machine to facilitate threading film through the machine to start operations.

The drawing shows three knife blades 7 which split the film into four parts 9. This is illustrative only. Any number of knives may be used. Ordinarily the film will be cut into strips about one inch wide. The strips may be as wide as two inches or wider, and as narrow as one-half inch or narrower. The strips are passed under the roller 10 and then through the ring 11 which prevents their separating prematurely and ripping the film ahead of the knife blades 7. From the ring 11, the separate strips 9 are fed around grooved guide rollers 12 to suitable heating means. Other heating means may be substituted for that here shown which comprises the rolls 13, 14 and 15. The rollers 13 and 14 in the design shown are long rollers extending preferably the width of the machine. One or both of these rollers are driven rollers. The short rolls 15 rests on the rollers 13 and 14 and are driven by them. Guide means (not shown) keep the roll 15 from migrating to the left or right. From the roll 14 the individual strips of film pass over the bar 16 through the eyes 17 to the twisting mechanism.

The twisting mechanism may be of any usual design. As shown, it comprises the spindles 18 driven by belts (not shown) which pass around the pulleys 19. Over the spindles are the spools 20 which are rotated at a high speed by the spindles. The bar 21 is mounted so that it moves vertically up and down over the length of the spools as the twisted film is wound onto the spools. The spools are located within holes in the bar 21. The bar 21 is equipped with the usual rings 22 on which the travellers 23 of the usual type circulate in winding the twisted strips on the spools. The equipment indicated by the numerals 17 through 23, inclusive, may be of a conventional type and operated in the conventional manner.

In passing from the roll 1 to the spool, the film is heated and stretched. The most satisfactory place for applying heat is through the roll 14. This roll may, for example, be heated to such a temperature that in passing over the roll the film is heated to a temperature around 90 to 100° C. The pressure of the roll 15 on the roll 14 maintains the rate of feed of the film over the roll 14. The winding mechanism is so geared that the twisted strip is wound on the spool at a greater lineal speed than that at which it passes over the roll 14. It is wound on the spool at a speed at least double that of the surface speed of the roll 14 and may be wound at a rate four or five or more times that of the surface speed of the roll 14. This stretches the heated film, and the stretch normally takes place just as the film leaves the roll 14. The film is kept in a flat condition from the supply roll 1 until it passes over the bar 16. After it leaves the bar 16, it is twisted by the movement of the traveller in the way that cotton yarn is commonly twisted. The film is quickly cooled by the air and its temperature is lowered to the point where on twisting, the overlapping, contacting plies do not become heat-sealed together. The twist imparted to the film may be about one and one-half to two and one-half turns per inch to a narrow ribbon of the film which is about one inch wide and only a fraction of a hundredth of an inch thick. Ordinarily the film supplied to the apparatus will be about .001 of an inch thick. It may be transparent or colored with a pigment or dye. It may contain a stabilizer, such as hexamethylene tetramine.

The drawing and description are illustrative and may be modified as required to adapt various types of twisters now on the market to carry out the new process herein suggested.

I claim:

1. In a twister of the type comprising a plurality of spindles adapted to be rotated at high speed and each adapted to carry a spool, adjacent each spool a traveller adapted to circulate around the spool and travel over the length of the spool to provide for the uniform winding of the material on the spool and over each spindle a guide, the improvement which comprises a roll adapted to hold rubber hydrochloride film and means for slitting the film into a plurality of strips with means for conveying each such strip to a separate guide and spool.

2. In a twister of the type comprising a plurality of spindles adapted to be rotated at high speed and each adapted to carry a spool, adjacent each spool a traveller adapted to circulate around the spool and travel over the length of the spool to provide for the uniform winding of the material on the spool and over each spindle a guide, the improvement which comprises means for holding a plurality of rolls of rubber hydrochloride film, means for slitting each film into a plurality of strips and means for conducting one strip from each of said rolls through each guide.

3. In a twister of the type comprising a plurality of spindles adapted to be rotated at high speed and each adapted to carry a spool, adjacent each spool a traveller adapted to circulate around the spool and travel over the length of the spool to provide for the uniform winding of the material on the spool and over each spindle a guide, the improvement which comprises means for holding a roll of rubber hydrochloride film, and means for slitting the film into a plurality of strips, and for supplying these strips to the guides, and means for winding the twisted film coming from the guides onto the spools at a higher rate of speed than the speed at which the film is drawn from the roll, and means for heating the film to facilitate stretching.

4. In the method of twisting strands of rubber hydrochloride film by feeding them through a guide and twisting them as they pass under a traveller, circulated at a high rate of speed around a spool rotating at a higher rate of speed, with the traveller simultaneously passing back and forth over the length of the spool to insure uniform winding of the product on the spool, the improvement which comprises heating the film to cause it to become sticky, so that overlapping portions of the film will adhere together so as to cause it to stick together when twisted.

5. In the method of twisting strands of rubber hydrochloride film by feeding them through a guide and twisting them as they pass under a traveller, circulated at a high rate of speed around a spool rotating at a higher rate of speed, with the traveller simultaneously passing back and forth over the length of the spool to insure uniform winding of the product on the spool, the improvement which comprises heating the rubber hydrochloride film after it is delivered to the machine, and before it is wound on the spool, and stretching the heated film to increase its tensile strength before winding it on the spool.

GERALD D. MALLORY.